(12) United States Patent
Napper et al.

(10) Patent No.: US 7,660,466 B2
(45) Date of Patent: Feb. 9, 2010

(54) NATURAL LANGUAGE RECOGNITION USING DISTRIBUTED PROCESSING

(75) Inventors: Jonathon Leigh Napper, Balmain (AU); Paul Lapstun, Balmain (AU); Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 717 days.

(21) Appl. No.: 10/510,392

(22) PCT Filed: Aug. 16, 2004

(86) PCT No.: PCT/AU2004/001088

§ 371 (c)(1),
(2), (4) Date: Oct. 7, 2004

(87) PCT Pub. No.: WO2005/017767

PCT Pub. Date: Feb. 24, 2005

(65) Prior Publication Data

US 2006/0149549 A1    Jul. 6, 2006

(30) Foreign Application Priority Data

Aug. 15, 2003   (AU) .............................. 2003904350
Aug. 15, 2003   (AU) .............................. 2003904351

(51) Int. Cl.
   *G06K 9/00*    (2006.01)
   *G06K 9/62*    (2006.01)

(52) U.S. Cl. ...................................... 382/186; 382/188

(58) Field of Classification Search .................. 382/186, 382/187, 188
   See application file for complete search history.

(56) References Cited

U.S. PATENT DOCUMENTS

| | | | |
|---|---|---|---|
| 4,864,618 A |   | 9/1989 | Wright et al. |
| 5,051,736 A |   | 9/1991 | Bennett et al. |
| 5,455,872 A | * | 10/1995 | Bradley ..................... 382/228 |
| 5,477,012 A |   | 12/1995 | Sekendur |
| 5,546,538 A | * | 8/1996 | Cobbley et al. ............. 709/203 |
| 5,652,412 A |   | 7/1997 | Lazzouni et al. |
| 5,661,506 A |   | 8/1997 | Lazzouni et al. |
| 5,692,073 A |   | 11/1997 | Cass |
| 5,852,434 A |   | 12/1998 | Sekendur |

(Continued)

FOREIGN PATENT DOCUMENTS

GB    2306669 A    5/1997

(Continued)

OTHER PUBLICATIONS

Dymetman, M., and Copperman, M., "Intelligent Paper in Electronic Publishing, Artist Imaging, and Digital Typography, Proceedings of EP '98", Mar./Apr. 1998, Springer Verlag LNCS 1375, pp. 392-406.

*Primary Examiner*—Jon Chang (57) ABSTRACT

A method and system for computer-based recognition of natural language data. The method is implemented on a distributed computer network and includes obtaining natural language data, such as digital ink handwriting, using an input device (415), receiving the natural language data on a server via a network, processing the natural language data using a recognizer (440) residing on the server (430) to produce intermediate format data (445), transmitting the intermediate format data (445) to an application (450), and decoding the intermediate format data 445 into computer-readable format data using the application (450) and context information associated with the application (450).

3 Claims, 9 Drawing Sheets

U.S. PATENT DOCUMENTS

| | | |
|---|---|---|
| 5,870,706 A | 2/1999 | Alshawi |
| 5,982,928 A * | 11/1999 | Shimada et al. ............. 382/187 |
| 6,076,734 A | 6/2000 | Dougherty et al. |
| 6,216,013 B1 | 4/2001 | Moore et al. |
| 6,343,148 B2 * | 1/2002 | Nagy ......................... 382/187 |
| 6,456,740 B1 * | 9/2002 | Carini et al. ................. 382/187 |
| 6,456,974 B1 | 9/2002 | Baker et al. |
| 6,964,374 B1 | 11/2005 | Djuknic et al. |
| 7,289,685 B1 * | 10/2007 | Wolff et al. ................. 382/317 |
| 7,336,827 B2 * | 2/2008 | Geiger et al. ............... 382/186 |
| 2001/0012401 A1 | 8/2001 | Nagy |
| 2004/0126017 A1 * | 7/2004 | Seni et al. .................... 382/229 |
| 2005/0013487 A1 * | 1/2005 | Clary et al. ................. 382/187 |

FOREIGN PATENT DOCUMENTS

| | | |
|---|---|---|
| WO | WO 99/18487 A2 | 4/1999 |
| WO | WO 99/50787 A1 | 10/1999 |
| WO | WO 03/065246 A1 | 8/2003 |
| WO | WO 2004/077311 A1 | 9/2004 |

* cited by examiner

NATURAL LANGUAGE RECOGNITION USING DISTRIBUTED PROCESSING

CO-PENDING APPLICATIONS

Various methods, systems and apparatus relating to the present invention are disclosed in the following application, the disclosure of which is incorporated herein by reference:

PCT/AU2004/001087

CROSS REFERENCES

Various methods, systems and apparatus relating to the present invention are disclosed in the following granted US patents and co-pending US applications filed by the applicant or assignee of the present application: The disclosures of all of these granted US patents and co-pending US applications are incorporated herein by reference.

| | | | | | |
|---|---|---|---|---|---|
| 10/815,621 | 7,243,835 | 10/815,630 | 10/815,637 | 10/815,638 | 7,251,050 |
| 10/815,642 | 7,097,094 | 7,137,549 | 10/815,618 | 7,156,292 | 10/815,635 |
| 7,357,323 | 10/815,634 | 7,137,566 | 7,131,596 | 7,128,265 | 7,197,374 |
| 7,175,089 | 10/815,617 | 7,537,160 | 7,506,808 | 7,207,483 | 7,296,737 |
| 7,270,266 | 10/815,614 | 10/815,636 | 7,128,270 | 7,457,007 | 7,150,398 |
| 7,159,777 | 7,450,273 | 7,188,769 | 7,097,106 | 7,070,110 | 7,243,849 |
| 7,204,941 | 7,282,164 | 7,465,342 | 7,156,289 | 7,178,718 | 7,225,979 |
| 09/575,197 | 7,079,712 | 6,825,945 | 7,330,974 | 6,813,039 | 7,190,474 |
| 6,987,506 | 6,824,044 | 6,980,318 | 6,816,274 | 7,102,772 | 7,350,236 |
| 6,681,045 | 6,678,499 | 6,679,420 | 6,963,845 | 6,976,220 | 6,728,000 |
| 7,110,126 | 7,173,722 | 6,976,035 | 6,813,558 | 6,766,942 | 6,965,454 |
| 6,995,859 | 7,088,459 | 6,720,985 | 7,286,113 | 6,922,779 | 6,978,019 |
| 6,847,883 | 7,131,058 | 7,295,839 | 7,406,445 | 7,533,031 | 6,959,298 |
| 6,973,450 | 7,150,404 | 6,965,882 | 7,233,924 | 09/575,181 | 09/722,174 |
| 7,175,079 | 7,162,259 | 6,718,061 | 7,464,880 | 7,012,710 | 6,825,956 |
| 7,451,115 | 7,222,098 | 10/291,825 | 7,263,508 | 7,031,010 | 6,972,864 |
| 6,862,105 | 7,009,738 | 6,989,911 | 6,982,807 | 7,518,756 | 6,829,387 |
| 6,714,678 | 6,644,545 | 6,609,653 | 6,651,879 | 10/291,555 | 7,293,240 |
| 7,467,185 | 7,415,668 | 7,044,363 | 7,004,390 | 6,867,880 | 7,034,953 |
| 6,987,581 | 7,216,224 | 7,506,153 | 7,162,269 | 7,162,222 | 7,290,210 |
| 7,293,233 | 7,293,234 | 6,850,931 | 6,865,570 | 6,847,961 | 10/685,583 |
| 7,162,442 | 10/685,584 | 7,159,784 | 10/804,034 | 7,404,144 | 6,889,896 |
| 10/831,232 | 7,174,056 | 7,068,382 | 7,007,851 | 6,957,921 | 6,457,883 |
| 7,094,910 | 7,091,344 | 7,122,685 | 7,038,066 | 7,099,019 | 7,062,651 |
| 6,789,194 | 6,789,191 | 7,529,936 | 7,278,018 | 6,644,642 | 6,502,614 |
| 6,622,999 | 6,669,385 | 6,827,116 | 6,549,935 | 6,987,573 | 6,727,996 |
| 6,591,884 | 6,439,706 | 6,760,119 | 7,295,332 | 7,064,851 | 6,826,547 |
| 6,290,349 | 6,428,155 | 6,785,016 | 6,831,682 | 6,741,871 | 6,927,871 |
| 6,980,306 | 6,965,439 | 6,840,606 | 7,036,918 | 6,977,746 | 6,970,264 |
| 7,068,389 | 7,093,991 | 7,190,491 | 6,982,798 | 6,870,966 | 6,822,639 |
| 6,474,888 | 6,627,870 | 6,724,374 | 6,788,982 | 7,263,270 | 6,788,293 |
| 6,946,672 | 6,737,591 | 7,091,960 | 7,369,265 | 6,792,165 | 7,105,753 |
| 6,795,593 | 6,980,704 | 6,768,821 | 7,132,612 | 7,041,916 | 6,797,895 |
| 7,015,901 | 7,289,882 | 7,148,644 | 10/778,056 | 10/778,058 | 10/778,060 |
| 7,515,186 | 10/778,063 | 10/778,062 | 10/778,061 | 10/778,057 | 7,096,199 |
| 7,055,739 | 7,233,320 | 6,830,196 | 6,832,717 | 7,182,247 | 7,082,562 |
| 6,843,420 | 10/291,718 | 6,789,731 | 7,057,608 | 6,766,944 | 6,766,945 |
| 7,289,103 | 7,412,651 | 7,299,969 | 7,108,192 | 7,111,791 | 7,077,333 |
| 6,983,878 | 10/786,631 | 7,134,598 | 7,431,219 | 6,929,186 | 6,994,264 |
| 7,017,826 | 7,014,123 | 10/683,040 | 7,526,128 | 6,957,768 | 7,456,820 |
| 7,170,499 | 7,106,888 | 7,123,239 | 6,982,701 | 6,982,703 | 7,227,527 |
| 6,786,397 | 6,947,027 | 6,975,299 | 7,139,431 | 7,048,178 | 7,118,025 |
| 6,839,053 | 7,015,900 | 7,010,147 | 7,133,557 | 6,914,593 | 7,437,671 |
| 6,454,482 | 6,808,330 | 6,527,365 | 6,474,773 | 6,550,997 | 7,093,923 |
| 6,957,923 | 7,131,724 | | | | |

TECHNICAL FIELD

The present invention relates to a method of and system for natural language recognition, and in particular, to a method of and system for computer-based recognition of natural language data implemented on a distributed computer network.

BACKGROUND ART

Recent advances in pattern classification have enabled the development of sophisticated software systems that can recognize natural language data (i.e. natural language user input) such as speech (see for example L. Rabiner and B. Juang, "Fundamentals of Speech Recognition", Prentice Hall, Englewood Cliffs, N.J., 1993) or handwriting (see for example G. Lorette, "Handwriting Recognition or Reading? Situation At The Dawn of the 3rd Millennium", Advances In Handwriting Recognition, Series in Machine Perception and Artificial Intelligence, Vol. 34, pp. 3-15, World Scientific Publishing Co. 1999).

These applications allow users to communicate with a computerised system in a natural and convenient way, and permit the automation of tasks that previously required human input. Some examples of such applications include interactive voice response (IVR) systems, automated cheque-processing systems and automated form data-entry systems.

Figure 1:
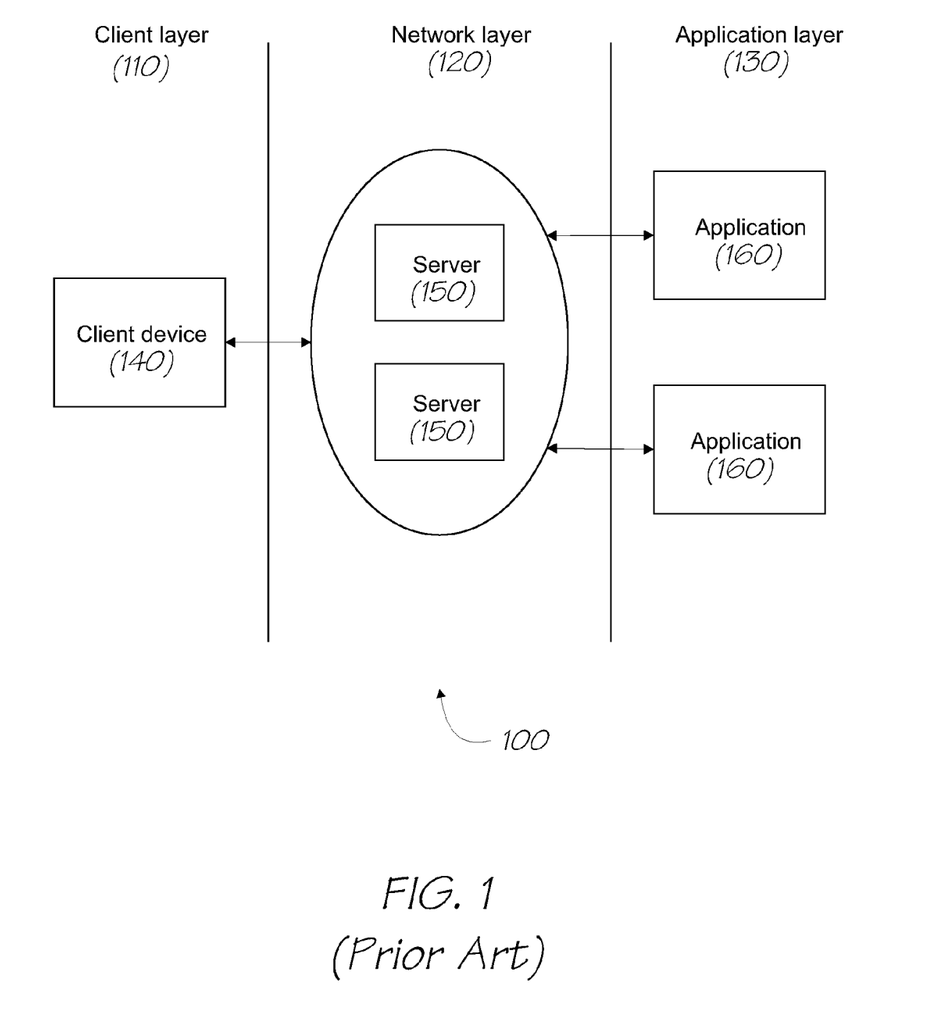
FIG. 1 (prior art) illustrates a distributed system architecture.

In addition, the growth of networked computing and the Internet has enabled the development of complex distributed systems, and the existence of open, standardized protocols has allowed the integration of end-user devices, centralized servers, and applications. An example of a three-tiered distributed system architecture is depicted in FIG. 1 (prior art), illustrating a system 100 which includes a client layer 110, network layer 120 and application layer 130. Client device 140 communicates with one or more servers 150 which in turn communicate with one or more applications 160. The combination of distributed computing and pattern recognition techniques has made possible the development of systems such as Netpage™ by Silverbrook Research Pty Ltd, an interactive paper-based interface to online information. Systems such as this give users the ability to interact with information from any location that provides network connectivity (including wireless network access) using familiar human-communication techniques such as handwriting or speech.

Figure 2:
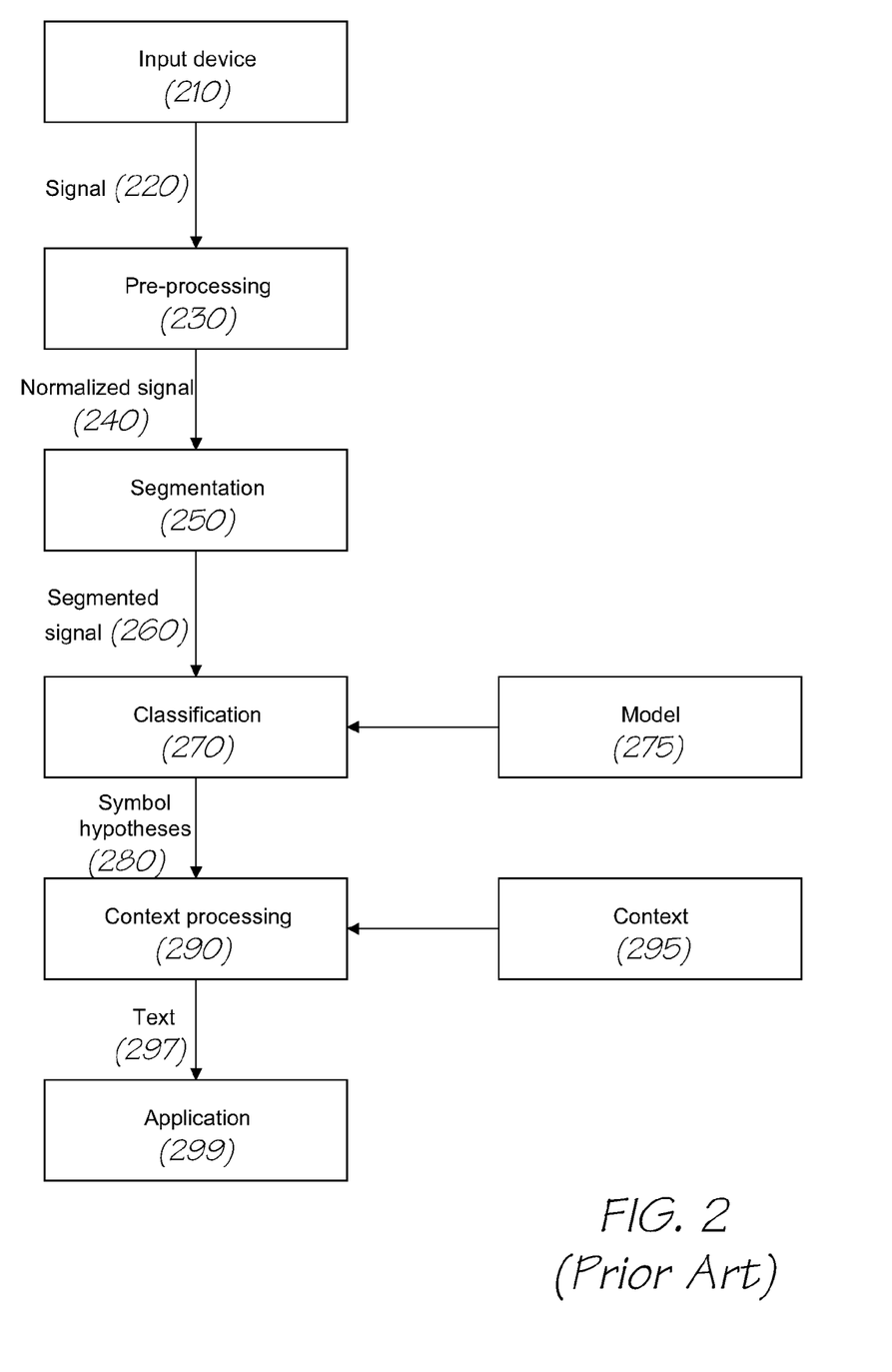
FIG. 2 (prior art) illustrates a flow chart of basic pattern recognition steps.

The basic processing steps of presently known pattern recognition systems are depicted in FIG. 2 (prior art). Processing begins when an input device 210 generates a signal 220 that is to be recognized by the system 100 (that is, to be classified as belonging to a specific class or sequence of class elements). Usually, one or more pre-processing procedures 230 are applied to remove noise and produce a normalized signal 240, which is then segmented 250 to produce a stream of primitive elements 260 required for a classification procedure 270. Note that often this segmentation 250 is "soft", meaning that a number of potential segmentation points are located, and the final segmentation points are resolved during classification 270 or context processing 290.

The segmented signal 260 is then passed to a classifier 270 where a representative set of features is extracted from the signal and used in combination with a pre-defined model 275 of the input signal to produce a set of symbol hypotheses 280. These hypotheses 280 give an indication of the probability that a sequence of segments within the signal represent a basic symbolic element (e.g. letter, word, phoneme, etc.). After classification 270, the context-processing module 290 uses the symbol hypotheses 280 generated by the classifier 270 to decode the signal according to a specified context model 295 (such as a dictionary or character grammar). The result 297 produced by the context processing 290 is passed to the application 299 for interpretation and further processing.

Natural language input is inconsistent, noisy, and ambiguous, leading to potential recognition and decoding errors. However, high recognition accuracy is required for pattern recognition applications to operate successfully, since mistakes can be expensive and frustrating to users. As a result, recognition systems should make use of as much contextual information as possible to increase the possibility of correctly recognizing the natural language input. For example, when recognizing a signal that must represent a country name, the recognition system can use a pre-defined list of valid country names to guide the recognition procedure. Similarly, when recognizing a phone number, a limited symbol set (i.e. digits) can be used to constrain the recognition results. The problem domain for many pattern recognition systems is inherently ambiguous (i.e. many of the input patterns encountered during processing cannot be accurately classified without further information from a different source).

The following discussion refers to handwriting by way of background information, however, the present invention should not be considered to be limited to application to only handwriting as the form of natural language data input.

Digital ink is a digital representation of the information generated by a pen-based input device. Generally, digital ink is structured as a sequence of strokes that begin when the pen device makes contact with a drawing surface and ends when the pen-based input device is lifted. Each stroke comprises a set of sampled coordinates that define the movement of the pen-based input device whilst the pen-based input device is in contact with the drawing surface.

As an example, one of the major issues faced in the development of highly accurate handwriting recognition systems is the inherent ambiguity of handwriting (e.g. the letters 'u' and 'v', 't' and 'f', and 'g' and 'y' are often written with a very similar appearance and are thus easily confused). Human readers rely on contextual knowledge to-correctly decode handwritten text, and as a result a large amount of research has been directed at applying syntactic and linguistic constraints to handwritten text recognition (see for example: H. Beigi and T. Fujisaki, "A Character Level Predictive Language Model and Its Application to Handwriting Recognition", Proceedings of the Canadian Conference on Electrical and Computer Engineering, Toronto, Canada, Sep. 13-16, 1992; U. Marti and H. Bunke, "Handwritten Sentence Recognition", Proceedings of the 15th International Conference on Pattern Recognition, Barcelona, Spain, Volume 3, pp. 467-470, 2000; D. Bouchaffra, V. Govindaraju, and S. Srihari, "Postprocessing of Recognized Strings Using Nonstationary Markovian Models", IEEE Transactions Pattern Analysis and Machine Intelligence, 21(10), pp. 990-999, October 1999; J. Pitrelli and E. Ratzlaff, "Quantifying the Contribution of Language Modeling to Writer-Independent On-line Handwriting Recognition", Proceedings of the Seventh International Workshop on Frontiers in Handwriting Recognition, Amsterdam, Sep. 11-13, 2000; R. Srihari, "Use of Lexical and Syntactic Techniques in Recognizing Handwritten Text", ARPA Workshop on Human Language Technology, Princeton, N.J., March 1994; and L. Yaeger, B. Webb, and R. Lyon, "Combining Neural Networks and Context-Driven Search for On-Line, Printed Handwriting Recognition in the Newton", AI Magazine, Volume 19, No. 1, pp. 73-89, AAAI 1998).

The increasing use of pen-based computing and the emergence of paper-based interfaces to networked computing resources (see for example: Anoto, "Anoto, Ericsson, and Time Manager Take Pen and Paper into the Digital Age with the Anoto Technology", Press Release, 6th Apr., 2000; and Y. Chans, Z. Lei, D. Lopresti, and S. Kung, "A Feature Based Approach For Image Retrieval by Sketch", Proceedings of SPIE Volume 3229: Multimedia Storage and Archiving Systems II, 1997) has highlighted the need for techniques to interpret digital ink. Pen-based computing allows users to interact with applications.

As a result of the progress in pen-based interface research, handwritten digital ink documents, represented by time-ordered sequences of sampled pen strokes, are becoming increasingly popular (J. Subrahmonia and T. Zimmerman: Pen Computing: Challenges and Applications. *Proceedings of the ICPR,* 2000, pp. 2060-2066). Handwriting typically involves writing in a mixture of writing styles (e.g. cursive, discrete, run-on etc.), a variety of fonts and scripts and different layouts (e.g. mixing drawings with text, various text line orientations etc.).

Presently, handwriting recognition accuracy remains relatively low, and the number of errors introduced by recognition (both for the database entries and for the handwritten query) means that present techniques do not work well. The process of converting handwriting into text results in the loss of a significant amount of information regarding the general shape and dynamic properties of the ink. In many handwriting styles (particularly cursive writing), the identification of individual characters is highly ambiguous.

Similar work has been performed in the field of speech recognition, natural language processing, and machine translation.

Some known natural language recognition systems currently exist. Paragraph, Inc. offers a network-based distributed handwriting recognition system called "NetCalif" (ParaGraph, Handwriting Recognition for Internet Connected Device, November 1999) that is based on their Calligraphy handwriting recognition software. The user's natural handwriting—cursive, print, or a combination of both—is captured by client software, then transmitted from an Internet-connected device to the NetCalif servers where it is converted and returned as typewritten text to the client device.

Philips has developed "SpeechMagic", a client/server-based, professional speech recognition software package (Philips, SpeechMagic 4.0, 2000). This system supports specialized vocabularies (called ConTexts) and dictation, recognition, and correction can be done, independently of the location, across a LAN, WAN, or the Internet.

In a networked information or data communications system, a user has access to one or more terminals which are capable of requesting and/or receiving information or data from local or remote information sources. The information source, in the present context, may be a database associated with an application. In such a communications system, a terminal may be a type of processing system, computer or computerised device, personal computer (PC), mobile, cellular or satellite telephone, mobile data terminal, portable computer, Personal Digital Assistant (PDA), pager, thin client, or any other similar type of digital electronic device. The capability of such a terminal to request and/or receive information or data can be provided by software, hardware and/or firmware. A terminal may include or be associated with other devices, for example a pen-based input device for handwriting input or a microphone for speech input.

An information source can include a server, or any type of terminal, that may be associated with one or more storage devices that are able to store information or data, such as digital ink, for example in one or more databases residing on a storage device. The exchange of information (i.e., the request and/or receipt of information or data) between a terminal and an information source, or other terminal(s), is facilitated by a communication means. The communication means can be realised by physical cables, for example a metallic cable such as a telephone line, semi-conducting cables, electromagnetic signals, for example radio-frequency signals or infra-red signals, optical fibre cables, satellite links or any other such medium or combination thereof connected to a network infrastructure.

The reference to any prior art in this specification is not, and should not be taken as, an acknowledgment or any form of suggestion that such prior art forms part of the common general knowledge.

DISCLOSURE OF INVENTION

The present invention seeks to provide improved natural language recognition, performed in a distributed system. This broadly includes a method of forwarding intermediate format data, generated by a recognizer module, to an application for context processing (i.e. decoding).

In another form, the present invention also seeks to provide means for managing multiple recognizers, user-specific dictionaries, and user-specific training of recognizers, desirable to make pattern recognition systems more accurate and flexible.

According to a first broad form of the invention, there is provided a method of providing computer-based recognition of natural language data, comprising the steps of: generating natural language data; and, transmitting the natural language data to a server; wherein, the server is programmed and configured to process the natural language data using a recognizer to produce intermediate format data, and is further capable of transmitting the intermediate format data to an application, and further wherein, the intermediate format data is decoded into computer-readable format data using context information.

According to a second broad form of the invention, there is provided a method for computer-based recognition of natural language data, comprising the steps of: receiving natural language data at a server from a remote input device; processing the natural language data using a recognizer residing on the server to produce intermediate format data; and, transmitting the intermediate format data to an application; wherein, the application is programmed and configured to decode the intermediate format data into computer-readable format data using context information associated with the application.

According to a third broad form of the invention, there is provided a method of providing computer-based recognition of natural language data for interaction with an application, wherein natural language data is received at a server from a remote input device, and the server processes the natural language data using a recognizer residing on the server to produce intermediate format data, the method comprising: the application receiving the intermediate format data from the server; and, the application decoding the intermediate format data into computer-readable format data using context information associated with the application.

According to specific, but non-limiting, embodiments of the invention, the natural language data is digital ink or speech; the digital ink is of a type from the group of: handwriting, textual, numerical, alphanumercial, pictorial or graphical; and/or the natural language data includes one or more of: normalizing the data; segmenting the data; and classifing the data.

According to further specific, but non-limiting, embodiments of the invention, the recognizer is implemented using software or hardware; the intermediate format data is a Directed Acyclic Graph (DAG) data structure; the DAG data structure is a matrix containing the processing results of segments of the natural language data; the intermediate format data includes segmented time-series classifier data; the natural language data is derived from protein sequencing, image processing, computer vision or econometrics; the application is remote to both the input device and the server; the application resides on the server; there is more than one recognizer, each recognizer controlled by a recognition management module; the application queries the recognition management module to identify a suitable recognizer to perform the processing; the context information is a user dictionary; the recognizer is able to be trained for a specific user; the input device is associated with a paper-based interface provided with coded markings; the coded markings are a pattern of infrared markings; the input device is an optically imaging pen; and/or each paper-based interface is uniquely identified and stored on a network server.

According to a specific embodiment of the invention, there is provided a method of recognising digital ink input by a user into a computer-based digital ink recognition system, the user interacting with a paper-based document, the paper-based document having disposed therein or thereon coded data indicative of a particular field of the paper-based document and of at least one reference point of the paper-based document, the method including the steps of:

receiving in a server, indicating data from a sensing device, operated by the user, regarding the identity of the paper-based document and at least one of a position and a movement of the sensing device relative to the paper-based document;

processing the indicating data using a recognizer residing on the server to produce intermediate format data; and, transmitting the intermediate format data to an application;

wherein, the application decodes the intermediate format data into computer-readable format data using context information associated with the paper-based document;

further wherein, the sensing device comprises:

(a) an image sensor adapted to capture images of at least some of the coded data when the sensing device is placed in an operative position relative to the paper-based document; and (b) a processor adapted to:
  (i) identify at least some of the coded data from one or more of the captured images;
  (ii) decode at least some of the coded data; and
  (iii) generate the indicating data using at least some of the decoded coded data.

In a particular form of the invention, the particular field of the paper-based document is associated with at least one zone of the paper-based document, and the method includes identifying the context information from the at least one zone.

According to a fourth broad form of the invention, there is provided a system for computer-based recognition of natural language data, the system implemented on a network and comprising: a server to receive natural language data generated by an input device via the network; and, a recognizer residing on the server to process the natural language data to produce intermediate format data; wherein, an application receives the intermediate format data and decodes the intermediate format data into computer-readable format data using context information associated with the application.

In further particular forms of the invention, the input device is a pen-based input device; the input device includes a microphone; the context information is derived from one or more of a document label, a document setting, a document field label or a document field attribute; the intermediate format data is transmitted to more than one application; and/or the application initiates the processing of the natural language data.

According to a further aspect of the present invention there is provided a method for computer-based recognition of natural language data, the method inplemented on a network and comprising the steps of:

obtaining natural language data using an input device;

receiving the natural language data on a server via the network;

processing the natural language data using a recognizer residing on the server to produce intermediate format data;

transmitting the intermediate format data to an application; and, decoding the intermediate format data into computer-readable format data using context information associated with the application.

According to a further aspect of the present invention there is provided a method of recognising digital ink input by a user into a computer-based digital ink recognition system, the method including the steps of:

providing a user with a paper-based document, the paper-based document having disposed therein or thereon coded data indicative of a particular field of the paper-based document and of at least one reference point of the paper-based document;

receiving in a server, indicating data from a sensing device, operated by the user, regarding the identity of the paper-based document and at least one of a position and a movement of the sensing device relative to the paper-based document;

processing the indicating data using a recognizer residing on the server to produce intermediate format data;

transmitting the intermediate format data to an application;

decoding the intermediate format data into computer-readable format data using context information associated with the paper-based document;

wherein the sensing device comprises:

(a) an image sensor adapted to capture images of at least some of the coded data when the sensing device is placed in an operative position relative to the paper-based document; and (b) a processor adapted to:
  (i) identify at least some of the coded data from one or more of the captured images;
  (ii) decode at least some of the coded data; and
  (iii) generate the indicating data using at least some of the decoded coded data.

According to a further aspect of the present invention there is provided a system for computer-based recognition of natural language data, the system implemented on a network and comprising:

an input device to generate natural language data;

a server to receive the natural language data via the network;

a recognizer residing on the server to process the natural language data to produce intermediate format data; and, an application to receive the intermediate format data and to decode the intermediate format data into computer-readable format data using context information associated with the application.

BRIEF DESCRIPTION OF FIGURES

The present invention should become apparent from the following description, which is given by way of example only, of a preferred but non-limiting embodiment thereof, described in connection with the accompanying figures.

MODES FOR CARRYING OUT THE INVENTION

The following modes, given by way of example only, are described in order to provide a more precise understanding of the subject matter of the present invention.

Figure 3:
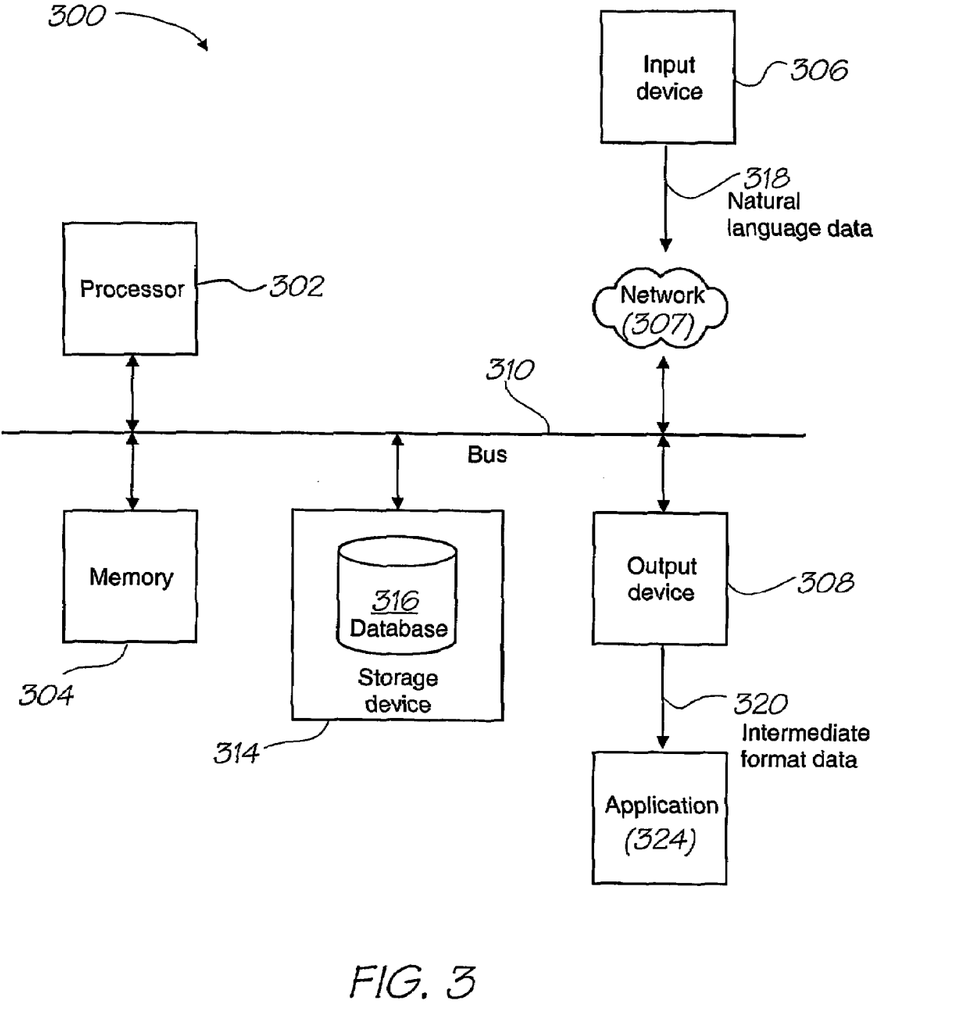
FIG. 3 illustrates an example processing system able to be used as a server to house a recognizer according to a particular embodiment of the present invention.

A particular embodiment of the present invention can be realised using a processing system, an example of which is shown in FIG. 3. In particular, the processing system 300 generally includes at least one processor 302, or processing unit or plurality of processors, memory 304 and at least one output device 308, coupled together via a bus or group of buses 310. At least one storage device 314 which houses at least one database 316 can also be provided, which may be remote and accessed via a network. The memory 304 can be any form of memory device, for example, volatile or non-volatile memory, solid state storage devices, magnetic devices, etc. The processor 302 could include more than one distinct processing device, for example to handle different functions within the processing system 300.

Input device 306, for example a pen-based input device or a microphone, is normally remote to the system 300. Input device 306 is used by a user to generate natural language data 318 which is preferably transmitted over network 307 to system 300 for processing. Output device 308 produces or generates intermediate format data 320, for example for transmission over a network, to be transmitted to application 324, which could be remote or local to the system 300. The storage device 314 can be any form of data or information storage means, for example, volatile or non-volatile memory, solid state storage devices, magnetic devices, etc.

In use, the processing system 300 may be a server and is adapted to allow data or information to be stored in and/or retrieved from, via wired or wireless communication means, the at least one database 316, which may be remote and accessed via a further network. The processor 302 receives natural language data 318 from input device 306, preferably via network 307, and outputs intermediate format data 320 by utilising output device 308, for example a network interface. The application 324 may return decoded data to the processing system. The application 324 may cause information to be printed, for example on a Netpage™ printer, at a user's location. More than one input device 306 can be provided. It should be appreciated that the processing system 300 may be any form of terminal, server, specialised hardware, or the like. The processing system 300 may be a part of a networked communications system. Also, the application 324 may initiate transfer of natural language data 318 from the input device 306 to server 300.

In a particular embodiment, the server 300 is part of a system for computer-based recognition of natural language data, the system implemented on a network and comprising: the input device 306 to obtain natural language data; server 300 to receive the natural language data 318 via a network 307; a recognizer residing on the server 300 to process, in processor 302, the natural language data 318 to produce intermediate format data 320; and, an application 324 to receive the intermediate format data 320 and to decode the intermediate format data 320 into computer-readable format data using context information associated with the application 324.

The following example provides a more detailed discussion of a particular embodiment of the present invention. The example is intended to be merely illustrative and not limiting to the scope of the present invention.

In a particular preferred embodiment, the present invention is configured to work with the Netpage™ networked computer system, a detailed description of which is given in the applicant's co-pending applications, including in particular, PCT Publication No. WO0242989 entitled "Sensing Device" filed 30 May 2002, PCT Publication No. WO0242894 entitled "Interactive Printer" filed 30 May 2002, PCT Publication No. WO0214075 "Interface Surface Printer Using Invisible Ink" filed 21 Feb. 2002, PCT Publication No. WO0242950 "Apparatus For Interaction With A Network Computer System" filed 30 May 2002, and PCT Publication No. WO03034276 entitled "Digital Ink Database Searching Using Handwriting Feature Synthesis" filed 24 Apr. 2003.

It will be appreciated that not every implementation will necessarily embody all or even most of the specific details and extensions described in these applications in relation to the basic system. However, the system is described in its most complete form to assist in understanding the context in which the preferred embodiments and aspects of the present invention operate.

In brief summary, the preferred form of the Netpage system provides an interactive paper-based interface to online information by utilizing pages of invisibly coded paper and an optically imaging pen. Each page generated by the Netpage system is uniquely identified and stored on a network server, and all user interaction with the paper using the Netpage pen is captured, interpreted, and stored. Digital printing technology facilitates the on-demand printing of Netpage documents, allowing interactive applications to be developed. The Netpage printer, pen, and network infrastructure provide a paper-based alternative to traditional screen-based applications and online publishing services, and supports user-interface functionality such as hypertext navigation and form input.

Typically, a printer receives a document from a publisher or application provider via a broadband connection, which is printed with an invisible pattern of infrared tags that each encodes the location of the tag on the page and a unique page identifier. As a user writes on the page, the imaging pen decodes these tags and converts the motion of the pen into digital ink. The digital ink is transmitted over a wireless channel to a relay base station, and then sent to the network for processing and storage. The system uses a stored description of the page to interpret the digital ink, and performs the requested actions by interacting with an application.

Applications provide content to the user by publishing documents, and process the digital ink interactions submitted by the user. Typically, an application generates one or more interactive pages in response to user input, which are transmitted to the network to be stored, rendered, and finally printed as output to the user. The Netpage system allows sophisticated applications to be developed by providing services for document publishing, rendering, and delivery, authenticated transactions and secure payments, handwriting recognition and digital ink searching, and user validation using biometric techniques such as signature verification.

Distributed Pattern Recognition

Figure 4:
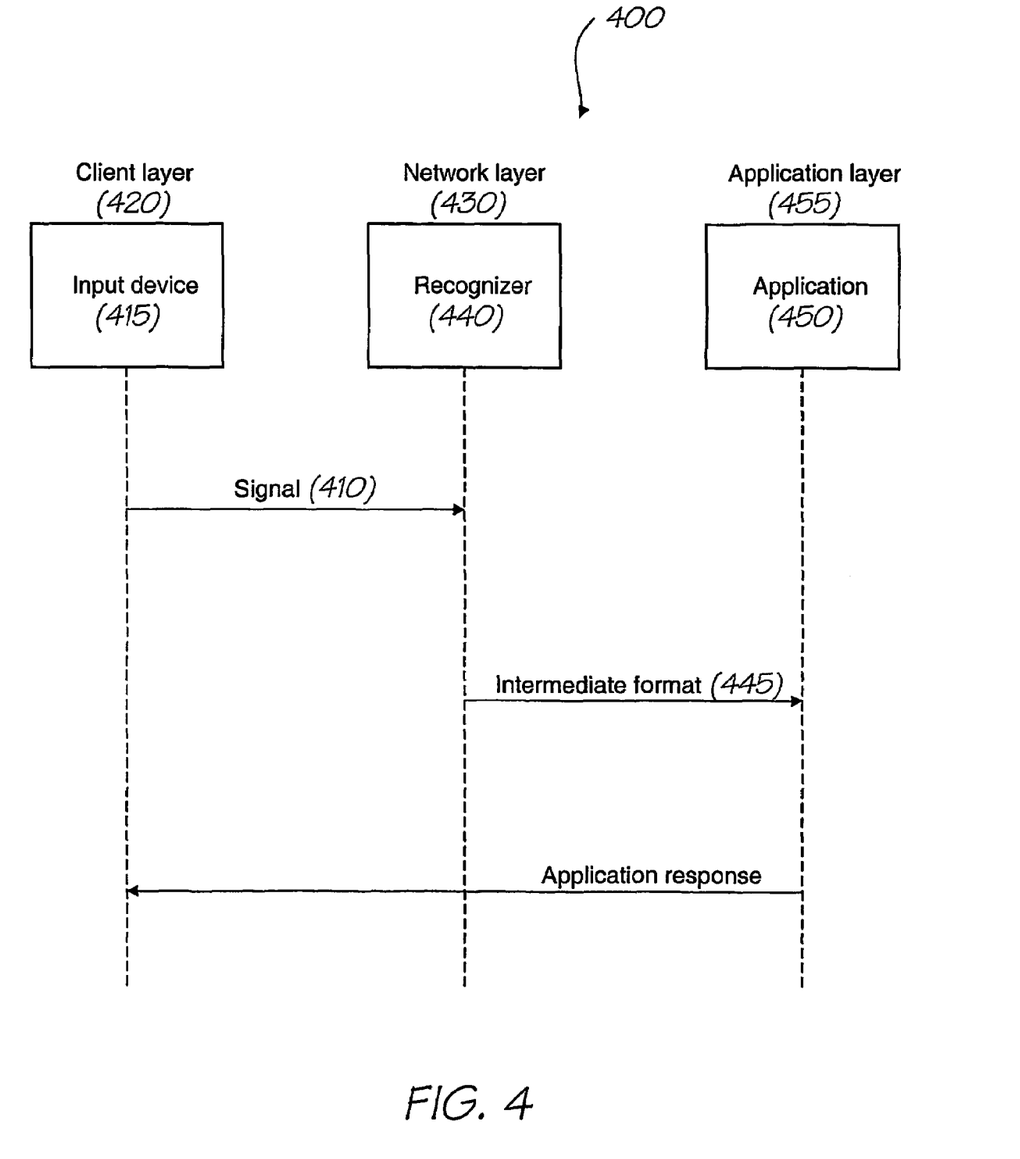
FIG. 4 illustrates an example distributed recognition system, according to a particular embodiment of the present invention.

An example architecture for a distributed pattern recognition system 400 is depicted in FIG. 4. In the example, a signal 410 is recorded by an input device 415 at a client layer 420 and transmitted over a network to a server (network layer 430) for recognition by a recognizer 440, with the intermediate results 445 transmitted back to the client layer 420 or a third party application 450 on an application layer 455 for interpretation and processing. One advantage of this approach is that client devices 415 and distributed applications 450 do not require the significant computing resources commonly needed to perform natural language pattern recognition, and the network servers that perform the recognition are not subject to the resource constraints that are inherent in many client devices 415 (e.g. mobile phones, personal-digital assistants, imaging pens, etc.). As a result, network servers are able to use extremely processor- and/or memory-intensive techniques to improve recognition accuracy, and can use hardware optimised to perform the specific recognition task.

Performing pattern recognition on a centralized server (e.g. processing system 300) also offers an advantage to pattern-recognition systems that employ user-specific adaptation to achieve higher recognition rates. For example, some handwriting recognition techniques develop a handwriting model for each user of the system based on previous recognition results, which is then used to improve the future accuracy of the system for that user (see for example L. Schomaker, H. Teulings, E. Helsper, and G. Abbink, "Adaptive Recognition Of Online, Cursive Handwriting", Proceedings of the Sixth International Conference on Handwriting and Drawing. Paris, July, 4-7 Telecom, (pp. 19-21), 1993 and S. Connell and A. K. Jain, "Writer Adaptation of Online Handwritten Models," Proc. 5th International Conference on Document Analysis and Recognition, Bangalore, India, pp. 434-437, September 1999).

This adaptation is more effective if a single server, or set of servers, performs all recognition for a user (rather than a large number of individual applications each performing their own recognition), since the server is able to perform adaptation based on the input generated by all applications. In addition to this, centralized server-based pattern recognition simplifies the management of the recognition system 400 by allowing recognizers to be reconfigured and upgraded without interaction with the distributed client devices 415 and applications 450, and allows training and test data to be easily collected.

However, the information required to perform the context processing stage of a pattern recognition system is generally application specific and is often very large (e.g. entries in a large application-specific database), making it impractical to transmit the context information to a centralized server for processing. A solution to this problem is to use a mechanism for distributed recognition as depicted in FIG. 4. When a user generates a signal (i.e. natural language data) 410 to be recognized and processed by an application, the signal 410 is submitted to a distributed server for processing. The server performs processing steps such as pre-processing, segmentation, and classification (see FIG. 2), but does not use a context model to decode the result (or only performs partial decoding as described in the following discussion). Rather, the intermediate recognition results (i.e. intermediate format data) are returned or sent to the application allowing the application to apply any arbitrarily complex and domain-specific context processing to decode the signal.

Symbol DAG

One method of returning the intermediate recognition results (i.e. intermediate format data) to an application is to use a symbol DAG (Directed Acyclic Graph), which is a generic data structure that contains symbol and associated scores as vertices, and valid transitions between symbols as edges. The structure can be implemented as a two-dimensional array of elements, each of which defines the output generated by the pattern classifier for a single segment of the signal and the associated valid transitions for that segment. This structure represents all the potential recognition alternatives that may be derived from the input signal based on the results of the classifier. The application uses this structure, in combination with a context model, to decode the input signal.

The symbol DAG is equivalent to a matrix where each column contains the results of the classification of a single segment of the input signal. Each element in the column represents the probability that the classified segment is a particular symbol, and includes an offset that indicates the next possible segment (column) in the input signal that can follow this symbol. Thus, the matrix represents all the possible decoding paths based on the output of the pattern classifier. These paths and associated classification scores can be combined with a context model to fully decode the input signal.

Note that the symbol DAG is applicable in any pattern recognition task where a sequence of classification results is decoded using a context or set of constraints. The symbols contained in the symbol DAG may be any primitive element that is generated as the output of a pattern classifier, including the output from a time-series classifier. Examples of such recognition systems include handwriting and speech recognition, protein sequencing (see A. C. Camproux, P. Tuffery, S. Hazout, "Hidden Markov Model Approach For Identifying The Modular Framework Of The Protein Backbone", Protein engineering, 12(12), pp. 1063, December 1999), image processing and computer vision (see Y. He, A. Kundu, "2-D Shape Classification Using Hidden Markov Model", IEBEE Transactions on Pattern Analysis, 13(11), November 1991), and econometrics (see T. Ryden, T. Terasvirta, S. Asbrink, "Stylized Facts of Daily Return Series and the Hidden Markov Model", Journal of Applied Econometrics, 13(3), pp. 217, May 1998).

Symbol DAG Example

Figure 5:
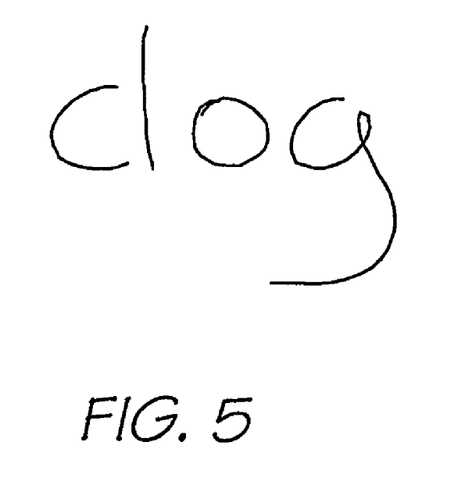
FIG. 5 illustrates an example of ambiguous handwriting input for "clog"/"dog"

As an example, Table 1 shows a symbol DAG that represents the output from a handwritten character recognizer generated by the ambiguous text given in FIG. 5. In this example, the recognizer has found two possible character segmentation arrangements, as depicted by the two rows in the symbol DAG. Note that in the examples, the symbol scores are given as probabilities; however, an actual implementation may typically use log-probabilities (i.e. the base-10 logarithm of the probability result) to improve the performance of context processing and to avoid overflow and underflow problems that occur when multiplying probabilities using finite precision floating-point operations.

To decode the alternatives, the context processor starts with the first entry in the DAG (i.e. the character 'c'). The score for this entry is added to the accumulated total (since log-probabilities are added rather than multiplied), and processing moves to the column given by the offset value in the entry (in this example, column 1). In column 1, two alternatives exist (i.e. "cl" or "cb"), and the scores for these alternatives are found by adding the scores to the previous total. The decoding continues until the end of the DAG is reached. Similarly, the second entry in column 0 (i.e. the character 'd') is decoded; note however, that column 1 is skipped in this traversal of the DAG, as indicated by the offset value of 2 in the character score entry. This is due to the letter 'd' being constructed using two strokes, and thus the recognition of the letters 'l' and 'b' cannot be valid in this alternative. Thus, the potential decoding alternatives in this example are:

$clog = 0.7*0.8*1.0*1.0 = 0.56$ $cbg = 0.7*0.2*1.0 = 0.14$ $dog = 0.3*1.0*1.0 = 0.30$ These values can now be combined with a language model or other contextual information to select the most likely word.

TABLE 1

Example DAG for "clog"/"dog" ambiguity

|  | 0 | 1 | 2 | 3 |
|---|---|---|---|---|
| Character | c | l | o | g |
| Offset | 1 | 2 | 3 | 0 |
| Score | 0.7 | 0.8 | 1.0 | 1.0 |
| Character | d | b |  |  |
| Offset | 2 | 3 |  |  |
| Score | 0.3 | 0.2 |  |  |

Figure 6:
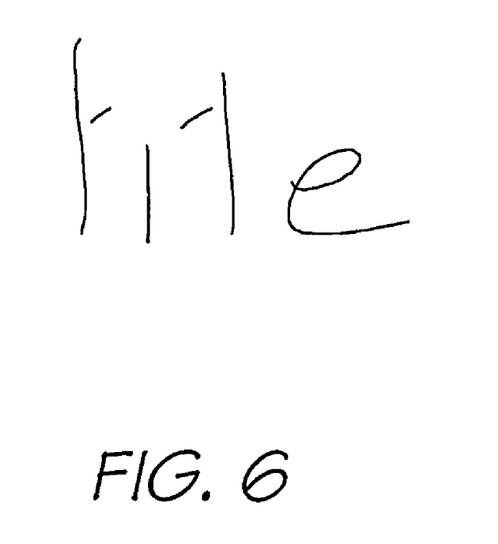
FIG. 6 illustrates an example of ambiguous handwriting input for "file"/"lite"

The DAG structure must ensure that strokes are assigned to an individual letter only once. To do this, alternate paths must be defined to ensure that if a stroke is assigned to a letter, no subsequent letter may use that stroke in its construction. An example of this is given in FIG. 6, with the derived DAG depicted in Table 2. In this example, the short, horizontal marks can potentially be recognized as crossbar elements of a letter 't', or diacritical marks for the letter 'i'. However, if a marking is used as a crossbar, it cannot subsequently be used as a diacritical. The potential decoding alternatives in this example are:

tile=0.6*1.0*0.6*1.0=0.36 tite=0.6*1.0*1.0*1.0=0.60 lite=0.4*1.0*1.0*1.0=0.40

These values can now be combined with a language model to select the most likely word.

TABLE 2

Example DAG for "lite"/"tile" ambiguity

|  | 0 | 1 | 2 | 3 | 4 | 5 |
|---|---|---|---|---|---|---|
| Character | t | i | i | t | l | e |
| Offset | 1 | 4 | 3 | 5 | 5 | — |
| Score | 0.6 | 1.0 | 1.0 | 1.0 | 0.6 | 1.0 |
| Character | l |  |  |  | t |  |
| Offset | 2 |  |  |  | 5 |  |
| Score | 0.4 |  |  |  | 0.4 |  |

Additionally, the character value of a DAG entry can be set to zero, indicating a NUL character (i.e. a character that does not change the text, but will modify the text probability). This allows word break positions (i.e. spaces) to be modeled as a SPACE/NUL pair, indicating that there is a certain probability that a space appears at that point in the DAG. For example:

TABLE 3

Example DAG for SPACE/NUL pair

|  | 0 | 1 | 2 |
|---|---|---|---|
| Character | a | NUL | b |
| Offset | 1 | 1 | — |
| Score | 1.0 | 0.6 | 1.0 |
| Character |  | SPACE |  |
| Offset |  | 1 |  |
| Score |  | 0.4 |  |

The potential decoding alternatives in this example are:

ab=1.0*0.6*1.0=0.6 ab=1.0*0.4*1.0=0.4

Distributed Recognizer Management

Figure 7:
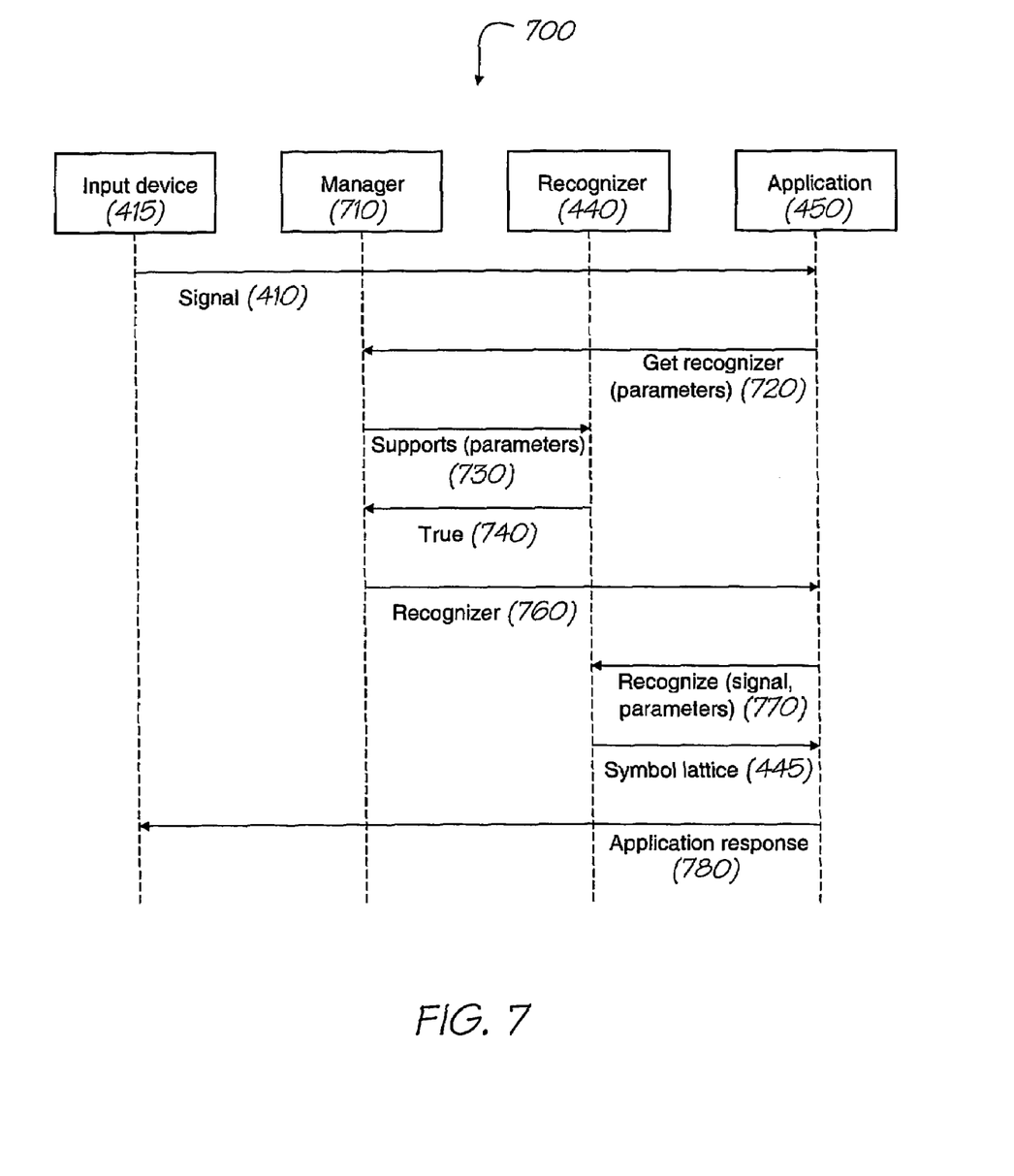
FIG. 7 illustrates an example recognition scenario, according to a particular embodiment of the present invention.
Figure 8:
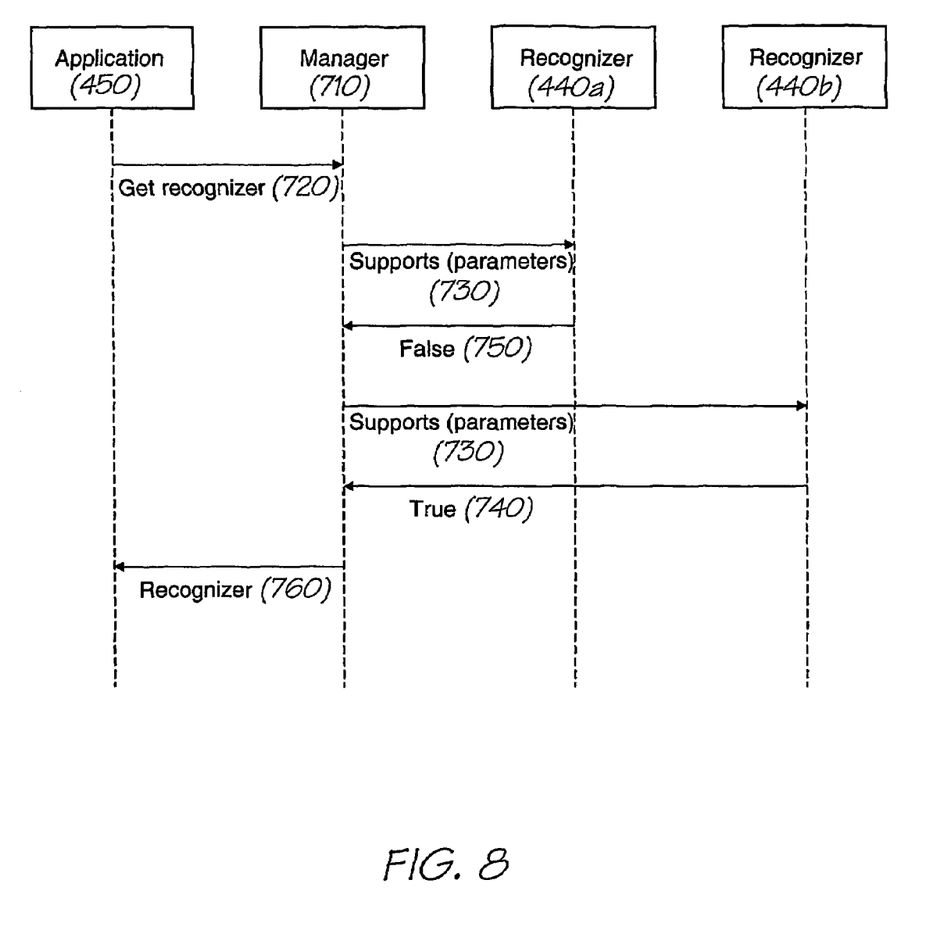
FIG. 8 illustrates an example recognizer selection scenario, according to a particular embodiment of the present invention.

Referring to FIGS. 7 and 8, a distributed recognition system 700 may support a number of different recognizers 440 that are controlled by a distributed recognition management system or recognition manager 710. These recognizers 440 can include systems capable of supporting different classes of recognition, such as different languages, dialects, or accents, or cursive or boxed input for handwriting systems. When an application 450 requires a recognition task to be performed, the application 450 first queries 720 the recognition manager 710 to find a recognizer 440 that matches the parameters of the input to be recognized (as depicted in FIG. 8). The recognition manager 710 then queries 730 each recognizer 440 to find a recognizer that supports the parameters specified by the application 450. When a recognizer 440 indicates support 740 (as opposed to no support 750 from recognizer 440a in FIG. 8) for the specified parameter set, the enumeration ends and the selected recognizer 440 (in the case of FIG. 8 recognizer 440b) is passed 760 to the application 450. Note that the individual recognizers 440 do not need to be centralized and may be distributed throughout the system 700, since the recognition manager 710 acts as a controller for the set of recognizers 440. The application 450 can then request processing by the selected recognizer by passing or directing 770 the signal and parameters to the selected recognizer 440. Intermediate format data 445, i.e. a symbol lattice, is returned to the application 450 and the application 450 can return a response 780 to the input device 415.

User-Specific Dictionaries

Distributed recognition systems can also support user dictionaries, which are user-specific word lists (and possibly associated a-priori probabilities) that include words that a user writes frequently but which are unlikely to appear in a standard dictionary (examples include company names, work or personal interest specific terms, etc.). User dictionaries can be stored and managed centrally so that words added to the dictionary when using one application are available to all applications for context processing. Obviously, applications can manage and use their own local user-specific dictionaries if required, since they have full control over context decoding.

When an application requires the recognition of a signal that may contain words found in the user dictionary (e.g. standard handwritten text input such as the subject line of an e-mail or an arbitrary voice message), the centralized recognition system generates the usual intermediate recognition results to be returned to the application for context decoding. However, in addition to this it decodes the intermediate results using the user-dictionary as a language model, the result of which is also returned to the application. These two intermediate results structures can be combined by the application during its context decoding to generate a final decoding that includes the user-specific dictionary information.

User-Specific Training

Figure 9:
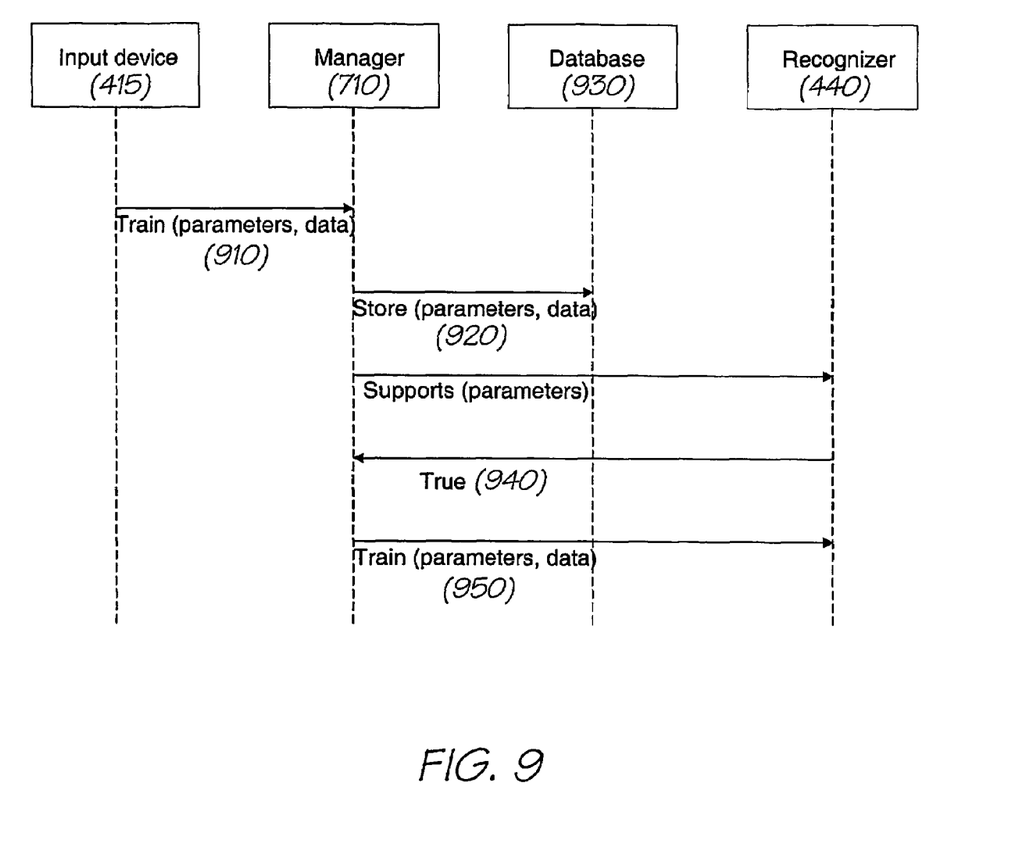
FIG. 9 illustrates an example recognizer training scenario, according to a particular embodiment of the present invention.

Distributed recognition systems may also support user-specific training for a recognizer 440, as depicted in FIG. 9. The data generated by a user-specific recognition training application is submitted 910 to the centralized recognition manager 710, which stores 920 the data in a database 930. The recognition manager 710 then enumerates all recognizers 440 to determine if they support the data format as defined by the parameters associated with the training data, and if so (True signal 940), submits the training data 950 to the recognizer 440 for user-specific training.

Figure 10:
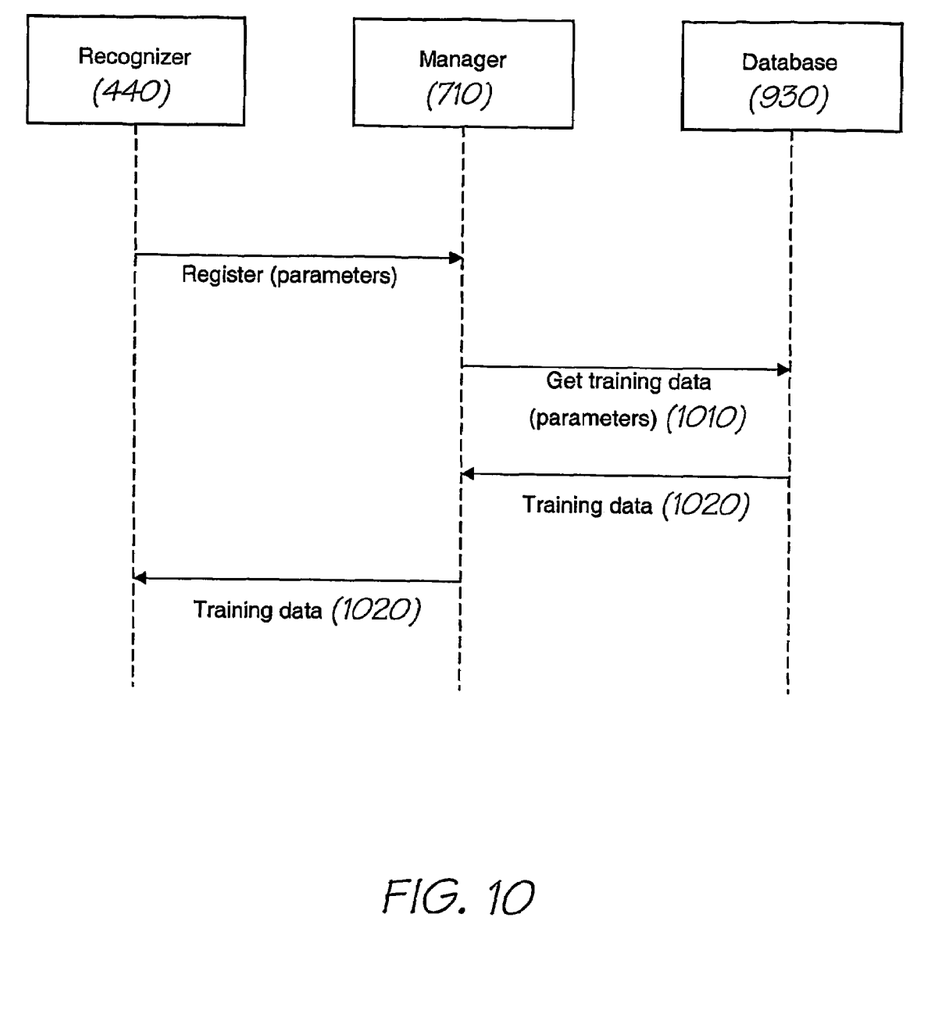
FIG. 10 illustrates an example recognizer registration scenario, according to a particular embodiment of the present invention.

When an existing recognizer is upgraded or a new recognizer is added to the system, the recognition manager 710 queries 1010 the training database 930 to determine if any training data 1020 of the format required by the recognizer 440 exists. If so, the training data 1020 is submitted to the newly registered recognizer 440 for processing, as depicted in FIG. 10.

The invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

The invention claimed is:

1. A method of recognising digital ink input by a user into a computer-based digital ink recognition system, the user interacting with a paper-based document, the paper-based document having disposed therein or thereon coded data indicative of a particular field of the paper-based document and of at least one reference point of the paper-based document, the method including the steps of:
   receiving in a server, indicating data from a sensing device, operated by the user, regarding the identity of the paper-based document and at least one of a position and a movement of the sensing device relative to the paper-based document;
   processing the indicating data using a recognizer residing on the server to produce intermediate format data; and,
   transmitting the intermediate format data to an application;
   wherein, the application decodes the intermediate format data into computer-readable format data using context information associated with the paper-based document;
   further wherein, the sensing device comprises:
   (a) an image sensor adapted to capture images of at least some of the coded data when the sensing device is placed in an operative position relative to the paper-based document; and
   (b) a processor adapted to:
      (i) identify at least some of the coded data from one or more of the captured images;
      (ii) decode at least some of the coded data; and
      (iii) generate the indicating data using at least some of the decoded coded data.

2. A method of recognising digital ink input by a user into a computer-based digital ink recognition system, the method including the steps of:
   providing a user with a paper-based document, the paper-based document having disposed therein or thereon coded data indicative of a particular field of the paper-based document and of at least one reference point of the paper-based document;
   receiving in a server, indicating data from a sensing device, operated by the user, regarding the identity of the paper-based document and at least one of a position and a movement of the sensing device relative to the paper-based document;
   processing the indicating data using a recognizer residing on the server to produce intermediate format data;
   transmitting the intermediate format data to an application;
   decoding the intermediate format data into computer-readable format data using context information associated with the paper-based document;
   wherein the sensing device comprises:
   (a) an image sensor adapted to capture images of at least some of the coded data when the sensing device is placed in an operative position relative to the paper-based document; and
   (b) a processor adapted to:
      (i) identify at least some of the coded data from one or more of the captured images;
      (ii) decode at least some of the coded data; and
      (iii) generate the indicating data using at least some of the decoded coded data.

3. The method as claimed in claim 1 or 2, wherein the particular field of the paper-based document is associated with at least one zone of the paper-based document, and the method includes identifying the context information from the at least one zone.

* * * * *